(12) United States Patent
Antonello et al.

(10) Patent No.: US 6,233,225 B1
(45) Date of Patent: May 15, 2001

(54) LINE CODING MISMATCH DETECTION TECHNIQUE

(75) Inventors: David J. Antonello, Howell; David L. Carter, Freehold, both of NJ (US); Nino Girardi, Staten Island, NY (US); Robert J. Hofmann, Piscataway, NJ (US); Karl T. Koppany, Warminster, PA (US); Michael J. Lutz, Flemington; Robert F. Merski, Sayreville, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/097,789

(22) Filed: Jun. 15, 1998

(51) Int. Cl.[7] .................................................. G01R 31/08
(52) U.S. Cl. ........................................... 370/251; 370/242
(58) Field of Search ..................................... 370/242, 241, 370/243, 244, 245, 246, 248, 249, 257, 247, 251, 252; 379/5, 6, 22, 27, 28, 29; 714/724, 732, 735

(56) References Cited

U.S. PATENT DOCUMENTS

| 4,757,501 | * | 7/1988 | Gorshe | 370/250 |
|---|---|---|---|---|
| 4,785,466 | * | 11/1988 | Lee et al. | 375/286 |
| 5,191,595 | * | 3/1993 | Parsons | 375/213 |
| 5,566,161 | * | 10/1996 | Hartmann et al. | 370/249 |
| 5,661,778 | * | 8/1997 | Hall et al. | 379/29 |
| 5,812,756 | * | 9/1998 | Taylor | 714/30 |
| 5,982,752 | * | 11/1999 | Katuszonek | 370/242 |

* cited by examiner

*Primary Examiner*—Alpus H. Hsu
*Assistant Examiner*—Brian Nguyen
(74) *Attorney, Agent, or Firm*—Robert B. Levy

(57) ABSTRACT

Line coding mismatches on a transmission channel in a telecommunications network will manifest a constant error signature having a certain number of errored seconds, severely errored seconds, unavailable time and lost sync. errors upon the application of a test pattern comprising a sequence of a first, second and third octet, each repeated a prescribed number of times. The first and second octets remain constant regardless of the nature of the transmission channel, while the nature of the third octet varies according to the transmission rate of the DS0 under test and associated DS1 under test. The test pattern will reveal a line coding mismatch. In a B8ZS environment (64 Kbps clear channel capability), the pattern may be run on any DS0 channel within the DS1. In an AMI-with-ZCS environment (56 Kbps or 64 Kbps restricted), the pattern must run on either channel 1 or 24.

6 Claims, 2 Drawing Sheets

LINE CODING MISMATCH DETECTION TECHNIQUE

TECHNICAL FIELD

This invention relates to a technique for detecting a line coding mismatch between adjacent DS1-terminating equipment on a digital transmission facility.

BACKGROUND ART

Presently, most telecommunications service providers transmit traffic in a digital format on facilities such as T1 carrier systems. To accomplish digital transmission, digitizing equipment samples an incoming analog signal, typically at a rate of 8000 times per second. Each sample corresponds to eight bits (an octet) yielding a 64 Kbps channel, referred to as a "DS0" signal. T1 carrier systems multiplex twenty-four DS0 signals to yield a DS1 signal. The twenty-four DS0 signals, together with a framing bit, constitute a DS1 frame. Twelve DS1 frames comprise a Super Frame (SF). Twenty-four DS1 frames comprise an Extended Super Frame (ESF). The framing bit in each DS1 frame enables synchronization between the sending and receiving equipment.

The individual bits in each DS1 frame correspond to electrical pulses (or optical pulses in the case of optical media). Each "1" bit corresponds to a pulse having either positive or negative polarity. Each "0" bit corresponds to no pulse. Most T1 carrier systems use a signal transmission technique known as Alternate Mark Inversion (AMI) where consecutive "1" bits have alternate positive and negative polarity. The transition from positive to negative amplitude pulses or from either negative or positive to no pulse (zero bit) enables the equipment receiving the bits of a DS1 signal to synchronize itself with the sending equipment. A long string of "0" bits can lead to loss of synchronization.

To avoid loss of synchronization, techniques exist for forcing an occasional transition by substituting at least one "1" bit for at least one "0" bit in a long zero-bit string. Zero Code Substitution (ZCS) is a technique that ensures such pulse transitions for T1 carrier systems without clear channel capability. The Binary 8 Zero Substitution (B8ZS) technique is one used for T1 carrier systems that have clear channel capability. A sending facility employing the B8ZS technique substitutes (replaces) a string of eight consecutive "0" bits with an eight-bit string containing four "1" bits and two intentional bipolar violations that occupy the same interval as the replaced string of eight "0" bits. The receiving equipment detecting a bit string created in accordance with the B8ZS technique converts the string back to eight "0" bits.

In order for the B8ZS technique to work effectively, adjacent sending and receiving DS1-terminating equipment must utilize compatible coding techniques, otherwise coding errors can occur. These errors can manifest themselves in corrupting data or as crackling noise on some voice calls. With previously used analog and digital tests, errors were detectable but the root cause was difficult to ascertain. Thus, there is a need for a technique to definitively detect line coding errors.

BRIEF SUMMARY OF THE INVENTION

In accordance with a preferred embodiment of the invention, the technique disclosed herein is especially effective in detecting line coding mismatches. Such line coding mismatches are detected by repeatedly transmitting a test pattern that includes a first octet, typically hex code B5 (binary 10110101), a prescribed number of times. The first octet is followed by a second octet, typically hex code A3 (binary 10100011), which is also repeated a prescribed number of times. Following the second bit pattern is a third octet selected in accordance with the channel bit rate, which is repeated a prescribed number of times. For example, the third bit pattern consists of hex code 01 (binary 00000001) for a 56 Kbps channel and hex code 00 (binary 00000000) for a 64 Kbps channel. In case of a line coding mismatch, the above-described sequence of bit patterns yields a constant error signature having a predetermined number of errored seconds, severly errored seconds, unavailable time and lost sync. A distinct advantage of the method described is that remote test systems can generate the bit patterns and use test results to quickly and definitively detect line coding mismatches.

BRIEF DESCRIPTION OF DRAWINGS

FIG. 1B is a graphical presentation of a DS1 frame at the output of an echo canceller with an incorrect line coding option setting of B8ZS, within the network of FIG. 1a.

DETAILED DESCRIPTION

FIG. 1 A depicts a prior art telecommunications network with a first telecommunications switch 12 typically, although not necessarily, a 4ESS switch manufactured by Lucent Technologies. The 4ESS switch possesses a test port 14, referred to as a RMS-D2 port, that allows the switch to receive calls that provide diagnostic capabilities from a remote source. One or more test controllers 16—16, referred to by the acronym TOPAS, each serve to initiate test calls and receive test results via a Digital Wide Area Network (DWAN) 18.

Figure 1A:
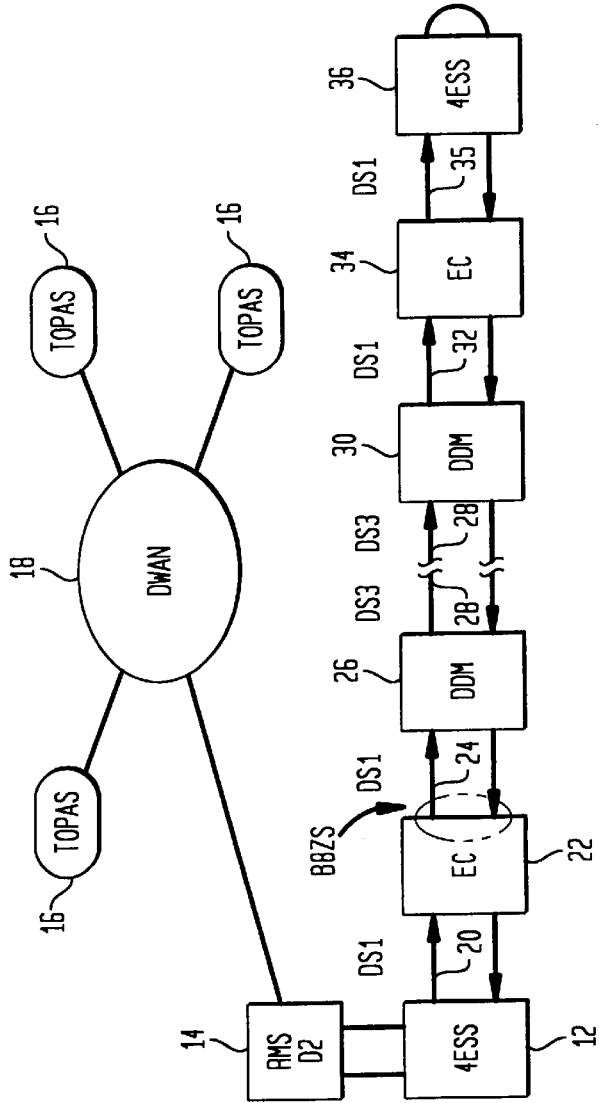
FIG. 1A depicts a block schematic diagram of a prior art telecommunications network that should be set to use AMI-WITH-ZCS.

In FIG. 1A, the switch 12 transmits a DS1 signal 20. Echo canceller 22 receives this signal. The echo canceller 22 transmits the DS1 signal 24, which is received by a Digital Data Multiplexer (DDM) 26. The DDM multiplexes DS1 signals to a DS3 signal for transmission on a DS3 channel 28. A second DDM 30, configured generally the same as the DDM 26, demultiplexes the DS3 signal into DS1 signals for further transmission 32. A second echo canceller 34 receives the DS1 signal 32 and transmits it on a DS1 35 to a second switch 36.

The loopback at switch 36 is established prior to test initiation. The DS0 signal sent on the DS1 between switch 12 and switch 36 is sent back to the originating switch 12 on the same channel as represented by a path through the network between various elements, with individual segments of the path represented by a separate one of the backwards-facing arrows 38–46.

Figure 1B:
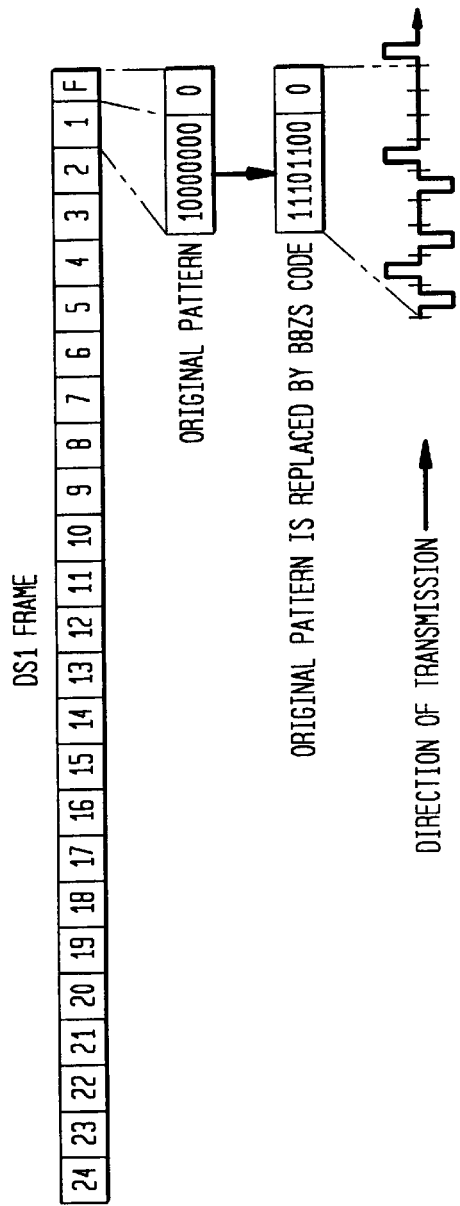

In FIG. 1A, the echo canceller 22 has its output erroneously set for B8ZS line coding. Referring to FIG. 1B, assume that the framing bit and octet 1 of the DS0 signal transmitted from the echo canceller 22 are originally 0 and 10000000, respectively. With the B8ZS suppression technique, the framing bit and first octet become 0 and 11101100, respectively, with two bipolar violations related to the four ones in place of four of the original zeros. When this pattern is returned to the originating switch, the bipolar violation is removed by DDM 26, and the pattern is returned to the originating switch with four 1s in place of four of the original 0s. This error is detected by the test equipment 14 every time octet 10000000 is transmitted and aligns with framing bit 0.

Figure 2A:
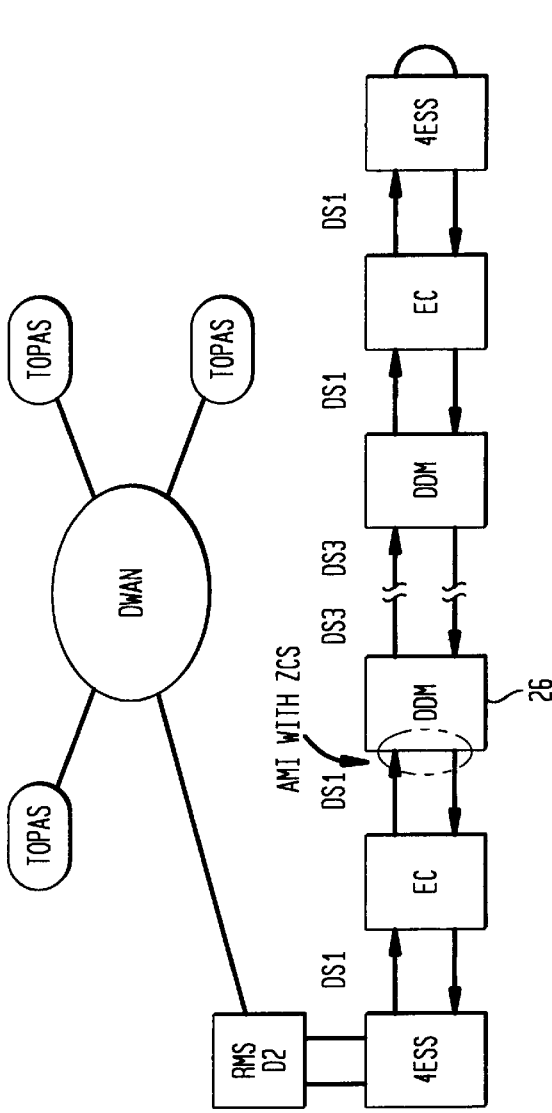
FIG. 2A depicts a block schematic diagram of a telecommunications network that should be set to use B8ZS.
Figure 2B:
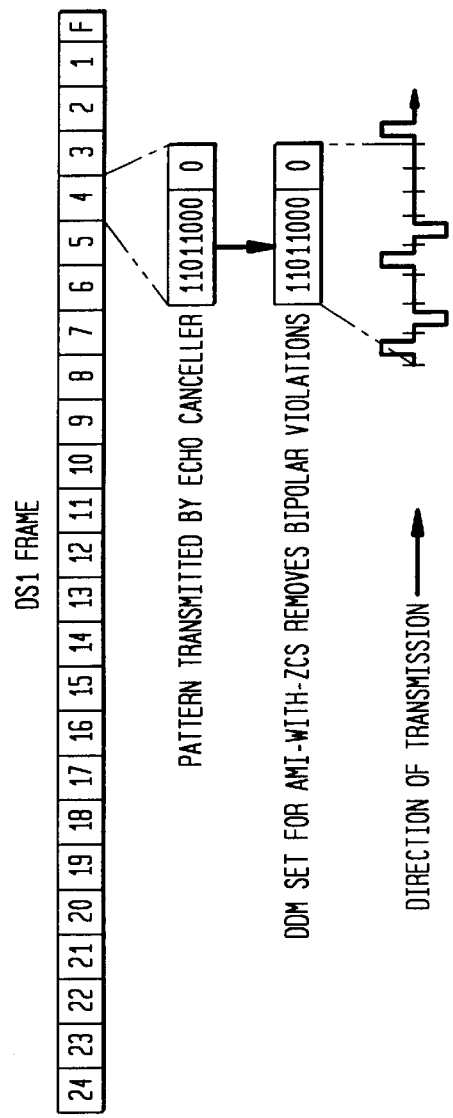
FIG. 2B depicts the DS1 frame at the input of the multiplexer of FIG. 2A.

Referring to FIG. 2A, assume that the DDM 26 is erroneously set for AMI with Zero Code Suppression (ZCS). Further assume that the fourth octet in the DS1 signal received at the forward input of the DDM 26 is the B8ZS code 11011000 with two intentional bipolar violations. When the DDM 26 is set for AMI-with-ZCS, only the bipolar violations get removed as seen in FIG. 2B (with transmitted bit order reversed). Equipment downstream (optioned for B8ZS in this example) from DDM 26 will not decode this bit pattern because this octet does not have two intentional bipolar violations characteristic of B8ZS coding.

Conventional test equipment may detect the existence of some problem when there are line coding option mismatches in pairs of adjacent transmission equipment, but the cause may not be clear. Also, conventional test methods often require placing signals on channels adjacent to the channel under test in order to trouble-shoot a line coding option mismatch problem. The present invention provides a procedure that yields deterministic test results in detecting line coding option mismatches in adjacent transmission equipment. This procedure only requires testing on a single channel.

The test procedure of the invention involves the application of a succession of three predetermined octets, each applied a prescribed number of times. When testing for line coding mismatches in an AMI-with-ZCS environment, the pattern runs on the first channel (i.e., the first DS0 circuit) to interact with the framing bit to generate a string of zero bits. When testing for line coding mismatches in a B8ZS environment, the test pattern can be run on any DS0 channel within the DS1. To detect a line coding mismatch on a 56 Kbps channel in an AMI-with-ZCS environment, the following test pattern is applied:

Octet 1: hex code B5 (binary 10110101) repeated 498 times

Octet 2: hex code A3 (binary 10100011) repeated 498 times

Octet 3: hex code 01 (binary 00000001) repeated 2 times

In the above pattern, octet 3 provides an indication of a B8ZS line coding mismatch, while octets 1 and 2 aid in synchronizing the test port 14 of switch 12 of FIG. 1A, and contribute in generating a constant error signature. If a B8ZS line coding mismatch is present, the above-described test pattern yields the following constant error signature:

Errored Seconds=15

Severely Errored Seconds=0

UnavailableTtime=0

Lost Sync.=0

Thus, running the above-described test pattern and detecting a constant error signature of 15 errored seconds reveals a B8ZS line coding mismatch.

To test for an AMI-with-ZCS line coding mismatch on a 64 Kbps channel in a B8ZS environment, a slightly different test pattern is necessary. For a 64 Kbps channel, the following pattern is applied:

Octet 1: hex code B5 (binary 10110101) repeated 498 times

Octet 2: hex code A3 (binary 10100011) repeated 498 times

Octet 3: hex code 00 (binary 00000000) repeated 1 time

In the above pattern, octet 3 provides an indication of an AMI-with-ZCS mismatch, while octets 1 and 2 aid in synchronizing the test port 14 of switch 12 in FIG. 2A and contribute to generate a constant error signature. If an AMI-with-ZCS coding mismatch is present, the above-described test pattern yields the following constant error signature:

Errored Seconds=15

Severely Errored Seconds=0

Unavailable Time=0

Lost Sync.=0

The foregoing describes a technique for detecting a line coding mismatch between adjacent DS1-terminating equipment on a digital transmission facility.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for detecting either Binary 8 zero Substitution (B8ZS) or Alternate Mark Inversion (AMI) with Zero Code Substitution (ZCS) line coding mismatches on a two-way transmission channel in a transmission DS1 facility, comprising the steps:

applying to the transmission channel a test pattern consisting of sets of different octets, a first octet applied a certain number of times, a second octet applied a certain number of times, and a third octet, selected in accordance with the characteristics of the transmission channel, applied a certain number of times; and detecting if the application of the test pattern produces a constant error signature on the transmission channel having a predetermined number of errored seconds, severely errored seconds, unavailable time, and lost sync, thereby indicating a line coding mismatch.

2. The method according to claim 1 wherein the first octet comprises hex code B5 (binary 10110101) and is repeated 498 times.

3. The method according to claim 1 wherein the first octet comprises hex code B5 (binary 10110101) where the second octet consists of hex code A3 (binary 10100011) and is repeated 498 times.

4. The method according to claim 1 involves wherein the third octet comprises hex code 01 (binary 00000001) and is repeated 2 times.

5. The method according to claim 1 wherein the transmission rate is 64 Kbps with clear channel capability and wherein the third octet comprises hex code 00 (binary 00000000) and is applied 1 time.

6. The method according to claim 1 includes the step of determining whether the constant error signature has fifteen errored seconds, 0 severely errored seconds, 0 unavailable time, and 0 lost sync. errors.

* * * * *